United States Patent [19]
Podgorski

[11] Patent Number: 5,377,285
[45] Date of Patent: Dec. 27, 1994

[54] TECHNIQUE FOR MAKING ULTRASTABLE RING RESONATORS AND LASERS

[75] Inventor: Theodore J. Podgorski, St. Paul, Minn.

[73] Assignee: Honeywell Inc., Minneapolis, Minn.

[21] Appl. No.: 16,390

[22] Filed: Feb

[51] Int. Cl.⁵ .................................. G02B 6/12
[52] U.S. Cl. .................................. 385/27; 385/32; 385/30; 385/14; 372/94
[58] Field of Search ............. 385/14, 27, 30, 32, 385/141, 142; 372/94; 356/350

[56] References Cited

U.S. PATENT DOCUMENTS

| 4,577,100 | 3/1986 | Meltz et al. ............. 385/132 X |
| 4,695,121 | 9/1987 | Mahapatra et al. ....... 385/132 X |
| 4,720,160 | 1/1988 | Hicks, Jr. ................. 385/42 X |
| 4,775,214 | 10/1988 | Johnson ................... 385/27 X |
| 4,923,278 | 5/1990 | Kashyap et al. .......... 385/128 |
| 5,043,991 | 8/1991 | Bradley .................... 385/141 X |
| 5,117,470 | 5/1992 | Inoue et al. ............... 385/14 |

Primary Examiner—Rodney B. Bovernick
Assistant Examiner—Hemang Sanghavi
Attorney, Agent, or Firm—Craig J. Lervick

[57] ABSTRACT

A technique is disclosed for creating an ultrastable ring resonator for use in the field of rotation sensing. The thermal characteristics of the ring resonator are controlled by properly choosing a substrate with thermal characteristics which cancel out the optical characteristics of the resonator.

20 Claims, 2 Drawing Sheets

TECHNIQUE FOR MAKING ULTRASTABLE RING RESONATORS AND LASERS

FIELD OF THE INVENTION

The present invention relates generally to optical waveguides. More specifically the invention pertains to the use of optical waveguides to create ring resonators. The present invention helps to reduce the thermal sensitivity of such ring resonators.

BACKGROUND OF THE INVENTION

Optical waveguides are used for many purposes including the transmission of optical signals and creation of resonators. Generally the waveguide can be configured in any number of patterns to achieve some predetermined goal. Examples include waveguides configured in closed loop configurations so as to create resonators, waveguides in linear configurations so as to comprise signal transmission mediums as well as waveguides configured to form y-splitters and optical couplers.

As previously mentioned optical waveguides can be configured in a closed loop to form an optical resonator. These optical resonators can then be used in rotation sensing devices. Within the closed loop resonator optical signals are caused to propagate around the closed loop in opposite directions. By measuring and/or combining these counterpropagating optical signs a rotation sensing device is realized.

A problem with all solid state rotation sensing devices is their sensitivity to changes in temperature. Changes in temperature have multiple affects on these solid state devices. Specifically, a change in temperature can cause physical expansion and/or contraction of the devices thus causing a change in the physical size of the waveguide. A change in temperature also affects the index of refraction of the dielectric material. Therefore changes in temperature have a dual affect on the optical waveguides.

Changes in physical size and optical index of refraction adversely affect the performance and operation of the optical waveguides. For use in rotation sensing, a waveguide configured as a ring resonator must be thermally stable since the resonant frequency must remain constant. Changes in resonant frequency due to effects other than rotation of the device adversely affects the operation of the rotation sensing device. Furthermore, since the optical signals which are being used to detect rotation are of a very high frequency, even small variations in size will affect the optical signals and subsequently reduce the accuracy and sensitivity of the rotation sensing device.

SUMMARY OF THE INVENTION

It is the object of the present invention to reduce the thermal sensitivity of resonators and other optical waveguide devices. Furthermore it is an object of the present invention to provide a thermally neutral ring resonator which can be used for rotation sensing over a wide range of temperatures.

The above mentioned objects are obtained by carefully choosing a substrate which will match the necessary thermal characteristics required. A ring resonator in accord with the present invention is attached to a surface of a substrate. The substrate is generally a thermally neutral substance and furthermore, its thermal characteristics can be tailored to meet particular needs. A closed loop optical waveguide is deposited or grown upon the surface of the substrate thus creating a resonator. Due to the material used and the configuration of the optical waveguide the resonator will have specific characteristics such as an index of refraction and a physical length. The optical path length of the resonator can be determined by multiplying the optical index of refraction times the physical length of the resonator. This relationship is shown in the following equation:

$$L_0 = nL \qquad 1)$$

Where $L_0$ is the optical path length of the resonator, n is the optical index of refraction, and L is the physical length of the resonator.

As previously mentioned, changes in temperature cause a dual change in the ring resonator. First, physical expansion of the resonator causes a change in its characteristics. A change in the physical length of the resonator will also change the optical path length $L_0$. However, the ring resonator is a very thin film deposited or grown upon the substrate. Therefore the physical expansion of the ring resonator is largely controlled by the physical expansion of the substrate. Therefore, by picking an appropriate material for the substrate, the physical expansion of the resonator can be controlled.

Secondly, changes in temperature cause a change in the optical characteristics of the waveguide. Specifically the optical index of refraction, n will change over temperature. A change in the optical index of refraction will also change the optical path length $L_0$ of the ring resonator. Changes in the optical index of refraction is dependent upon the material used to fabricate the resonator.

In summary, a change in temperature will create a change in the optical path length due to two sources. First, a change in the physical dimensions of the resonator will cause a change in the optical path length of the resonator. Secondly, a change in the optical index of refraction of the resonator will also cause a change in the optical path length of the resonator. However, if the materials for the resonator and substrate are appropriately chosen, the change in optical path length due to the two aforementioned factors can cancel each other out thus creating a negligible change in optical path length $L_0$ over temperature.

As mentioned the sensitivity of the optical index of refraction to temperature is largely dependent upon the material used to fabricate the optical resonator. Therefore, by determining the change in optical index of refraction over temperature an appropriate substrate can be chosen so that the change in optical path length over temperature is negligible. The characteristics of the substrate are much more flexible because the substrate material can be manufactured to achieve certain thermal characteristics. Specifically an annealing process which the substrate must undergo during fabrication can control its thermal characteristics. Therefore, the substrate characteristics can be adjusted through proper annealing.

BRIEF DESCRIPTION OF THE DRAWINGS

Further objects and advantages of the present invention can be seen by studying the following detailed description in conjunction with the drawing in which.

DETAILED DESCRIPTION OF THE INVENTION

Figure 1:
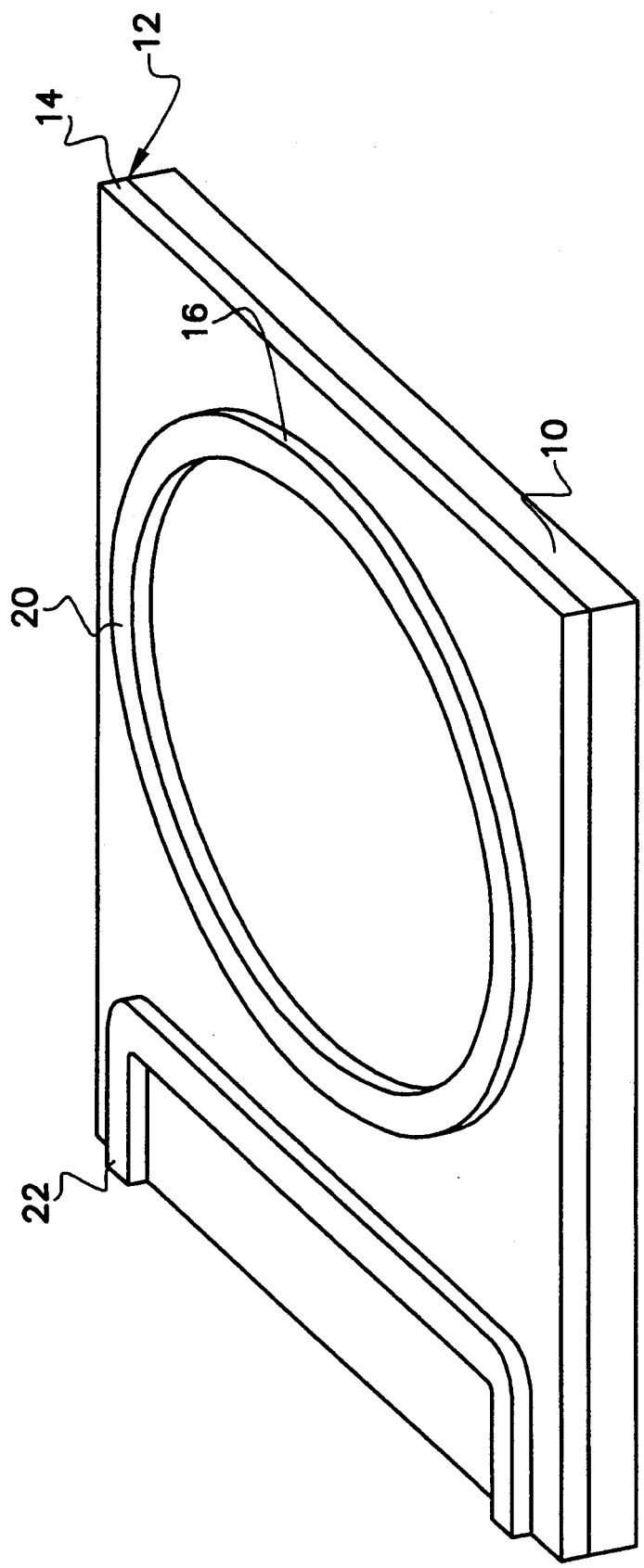
FIG. 1 is a perspective view of a waveguide configured as a resonator.
Figure 2:
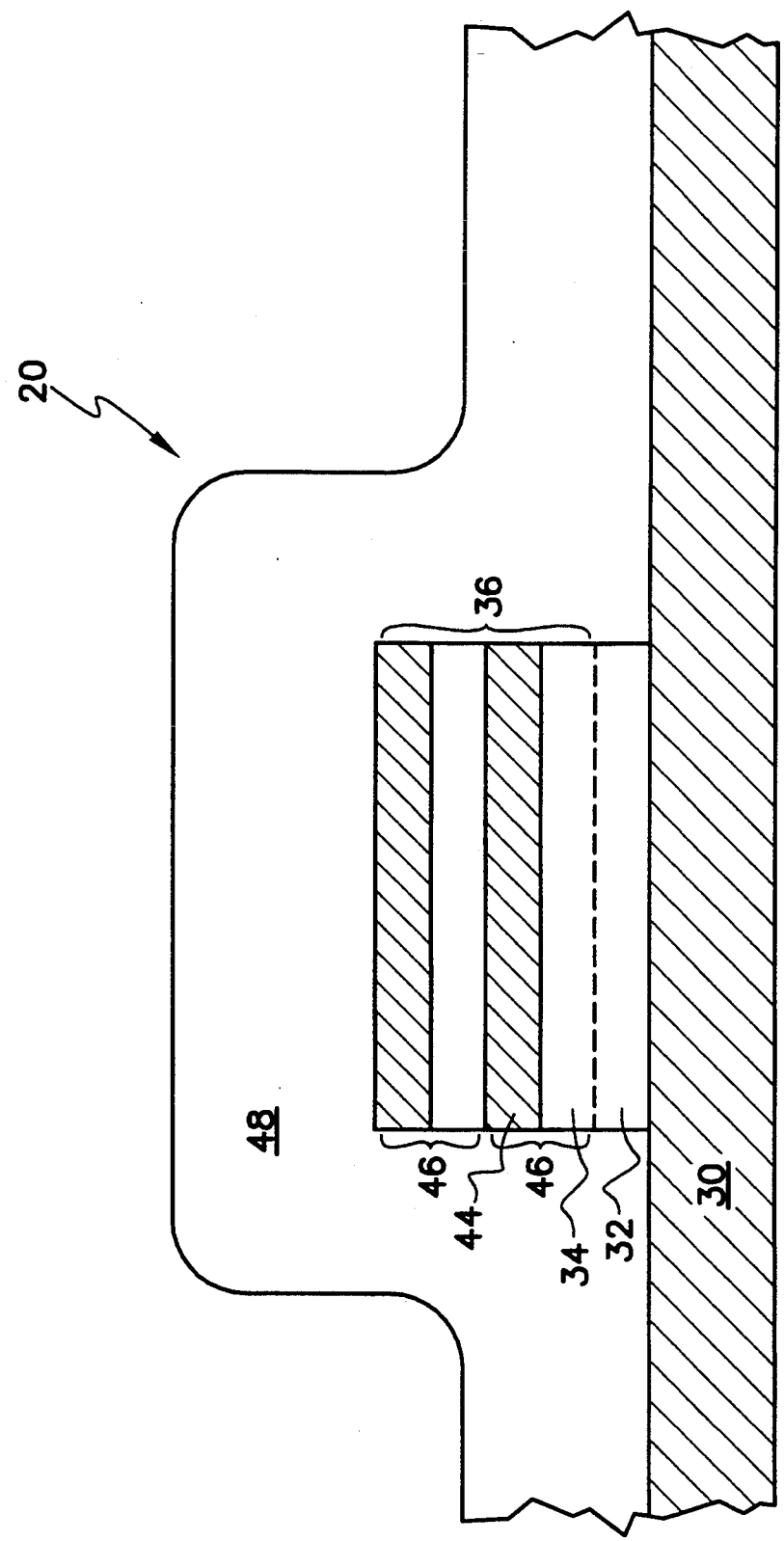
FIG. 2 is cross-sectional diagram showing one possible embodiment of a waveguide utilizing the methods of the present invention.

Referring now to FIG. 1 there is shown a substrate 10 upon which an optical resonator 20 is grown and/or deposited. Substrate 10 is generally made of thermally stable material; however, it's thermal characteristics are capable of alteration through proper annealing procedures. An appropriate material for use as a substrate is a glass-ceramic such as zerodur from the Schott-Glass Company.

Upon an upper surface 12 of substrate 10 there is deposited a first pattern layer 14. The first pattern layer is then etched to form a ring 16 upon substrate upper surface 12. Optical waveguide 20 is then deposited and/or placed upon etched ring 16. Optical waveguide 20 is configured in a closed loop manner so as to create a resonator. Also, upon substrate upper surface 12 is a coupler 22 which is used to couple an optical signal into resonator 20. It would be understood by those skilled in the art that numerous means of optical coupling can be used.

The optical waveguide 20 could take on many forms. In the preferred embodiment, the waveguide is a multilayered structure 36 attached to substrate 30. Multilayered structure 36 is comprised of alternating layers of lower index of refraction material 34 and higher index of refraction material 44. The materials used for lower index of refraction material 34 is silicon dioxide while zirconium dioxide is utilized for higher index of refraction material 44. Upon substrate 30 is an isolation layer 32 followed by a plurality of layer pairs 46 which make up multilayered structure 36. Covering the entire multilayered structure is a second isolation layer 48. This multilayered structure is more fully described in Assignee's copending application Ser. No. 07/997,994, filed Dec. 28, 1992, which is incorporated herein by reference.

Those skilled in the art will recognize that numerous structures for optical waveguide 20 could be used. For example, a solid strip of optically conductive material could be placed on etched ring 16.

In order to create an ultrastable ring resonator in accord with the present invention the materials of substrate 10 and optical resonator 20 must be carefully chosen. Criteria for choosing these elements will be explored further in the present specification.

The optical characteristics of the resonator 20 are very important to its performance as a resonator. The optical path length of resonator 20 can be determined by multiplying the physical length of the resonator by its optical index of refraction. This relationship is shown below as equation 1.

$$L_0 = nL \qquad 1)$$

$L_0$ is the optical path length of ring resonator 20, L is the physical length of resonator 20 and n is the index of refraction of the optical waveguide making the resonator 20. In order to obtain an ultrastable resonator it is important that the optical path length of resonator 20 be held constant. This is especially critical when ring resonator 20 is to be used as a rotation sensing element.

Ring resonator 20 displays several unique thermal characteristics. During changes in temperature the optical path length of resonator 20 changes due to two significant factors. First, expansion or contractions of the physical size of resonator 20 causes the optical path length to change. Secondly, a change in temperature causes the optical index of refraction of resonator 20 to change.

Resonator 20 is a thin film optical waveguide deposited upon substrate 10. Any physical changes in size due to changes in temperature of a optical resonator 20 will coincide with the physical changes in size of substrate 10. Substrate 10 will have a specific thermal characteristics which can be altered and tuned to meet the necessary requirements.

The physical length of resonator 20 will change at some rate over temperature. This rate of change is denoted dL/dT. Changes in the optical path length of resonator 20 due to changes in the physical length are equal to the index of refraction times the rate of change in physical length times the change in temperature. This relationship is shown in equation 2:

$$\Delta L_0 = n \frac{dL}{dT} \Delta T \qquad 2)$$

where n is the index of refraction, dL/dT is the rate of change in length over temperature and $\Delta T$ is the change in temperature. Since the rate of change in physical size of resonator 20 is controlled by the rate of change of substrate 10 therefore the term dL/dT can be controlled and adjusted through proper choosing and preparation of substrate 10.

The second source of change in the optical path length of resonator 20 is due to change in the optical characteristics of resonator 20. Resonator 20 will have some rate of change in its index of refraction over temperature. This rate of change is denoted by dn/dT. The change in the optical path length due to change in index of refraction can be obtain by multiplying the physical length times the rate of change of the index of refraction over temperature, times the change in temperature. This relationship is shown in equation 3:

$$\Delta L_0 = L \frac{dn}{dT} \Delta T \qquad 3)$$

where L is the physical length of resonator 20, dn/dT is the rate of change of the index of refraction and $\Delta T$ is again the change in temperature. This aspect of the change in optical path length will generally be controlled by the materials and the configuration of resonator 20.

The overall change in optical path length due to a change in temperature is equal to the sum of the two contributing factors. Thus, the overall change in optical path length is equal to the change due to physical expansion plus the change in optical characteristics. This relationship is shown in equation 4 below:

$$\Delta L_0 = n \frac{dL}{dT} \Delta T + L \frac{dn}{dT} \Delta T \qquad 4)$$

As can be seen by examining equation 4 it is most desirable and advantageous that the overall change in optical path length be negligible. Since the physical expansion of resonator 20 can be controlled by appropriately choosing the substrate 10, the changes in optical path length can be nullified. By knowing the optical characteristics of the waveguide over temperature an appropriate substrate can be created.

For a thin film waveguide on a thick substrate the coefficient of thermal expansion ($\alpha$) of the waveguide equals that of the substrate and $$\alpha = \frac{1}{L}\frac{dL}{dT} \qquad 5)$$

In order to make $\Delta L_0 = 0$ we must make $$\alpha = \frac{1}{L}\frac{dL}{dT} = \frac{-1}{n}\frac{dn}{dT} = \frac{-1}{n}\beta \qquad 6)$$

where $\beta = dn/dT$. The index $\beta$ can range from $10 \times 10^{-6}/C$ for BK7 glass to $1 \times 10^{-6}/C$ for fused silica while n ranges from 1.5 for fused silica to 2.1 for zirconium dioxide. Using midrange values for $\beta$ and n requires an $\alpha = -3 \times 10^{-6}/C$ to achieve $\Delta L = 0$. This value can be achieved using an appropriately annealed glass ceramic substrate material.

Controlling of the thermal characteristics of the substrate can be achieved by a number of methods. The first of the these methods is the choice of appropriate materials while the second of these methods is through proper annealing and manufacturing procedures. Both of these methods for controlling thermal characteristics of substrates are well known to those skilled in the art.

Having described the present invention in considerable detail it should be apparent to those skilled in the art that the invention can be modified in arrangement and detail without departing from the principles of the invention. We claim all modifications coming within the scope and spirit of the following claims.

What is claimed is:

1. A thermally stable ring resonator, comprising:
   a substrate having a first coefficient of thermal expansion; and
   a waveguide means configured in a closed loop and attached to the substrate for causing an optical signal to resonate, the waveguide means having an index of refraction, a predetermined length, and an optical coefficient of thermal expansion, wherein changes in temperature cause a change in the physical length of the waveguide means which is equivalent to the substrate coefficient of thermal expansion times the change in temperature, and changes in temperature also cause a change in the optical characteristics of the waveguide means equivalent to the optical coefficient of thermal expansion times the change in temperature, and the change in physical length of the waveguide means times the index of refraction is equivalent and opposite to the change in optical characteristics times the predetermined length.

2. The resonator of claim 1 wherein the substrate has a planar surface upon which the waveguide means is attached.

3. The resonator of claim 1 wherein the substrate is a glass ceramic.

4. The resonator of claim 3 wherein the waveguide means is zirconium dioxide.

5. The resonator of claim 1 wherein the waveguide means is a stack of a first material and a second material wherein the first material has an index of refraction lower than that of the second material, the waveguide means having a plurality of cycles wherein the material oscillates between the first material and the second material as the waveguide is traversed.

6. A thermally stable optical waveguide for transmitting optical signals, comprising:
   a substrate having a predetermined coefficient of thermal expansion; and
   a waveguide means attached to the substrate for carrying optical signals, the waveguide means having a selected index of refraction, a temperature coefficient and a predetermined physical length, the optical path length of the waveguide means being equal to the index of refraction times the predetermined physical length, wherein the optical path length of the optical waveguide changes over temperature due to a change in the physical length of the waveguide means and also changes due to a change in the optical characteristics of the waveguide means, the two changes in optical path length equal and opposite to one another resulting in overall change in the optical path length.

7. The optical waveguide of claim 6 wherein the change in optical path length due to change in the physical length is equal to the change in physical length times the index of refraction.

8. The optical waveguide of claim 7 wherein the change in physical length is equal to the substrate predetermined coefficient of thermal expansion multiplied times the change in temperature.

9. The optical waveguide of claim 8 wherein the change in optical path length due to a change in optical characteristics is equal to the change in the index of refraction times the physical length.

10. The optical waveguide of claim 9 wherein the change in optical characteristics is equal to the temperature coefficient multiplied times the change in temperature.

11. The optical waveguide of claim 10 wherein the waveguide means is zirconium dioxide.

12. The optical waveguide of claim 10 wherein the waveguide means is a multilayered stack of a first material and a second material wherein the first material has an index of refraction lower than that of the second material, the waveguide means having a plurality of layers.

13. An ultrastable ring resonator, comprising:
    a substrate; and
    a waveguide means attached to the substrate and configured as a closed loop for causing an optical signal to resonate within the waveguide means, the waveguide means having a physical length and an index of refraction, the waveguide means having a optical length equal to the physical length multiplied times the index of refraction, wherein changes in temperature cause a first change in optical length due to a change in the index of refraction and a second change in optical length due to a change in the physical length, and wherein the first change in optical length cancels out the second change in optical length.

14. The resonator of claim 13 wherein the first change in optical length is equal to the physical length times the change in the index of refraction.

15. The resonator of claim 13 wherein the waveguide means has an optical coefficient of thermal expansion and the change in the index of refraction is equal to the optical coefficient of thermal expansion multiplied times the change in temperature.

16. The resonator of claim 15 wherein the substrate has a coefficient of thermal expansion and the change in physical length of the waveguide is equal to the substrate coefficient of thermal expansion times the change in temperature.

17. The resonator of claim 16 wherein the substrate is a glass-ceramic.

18. The resonator of claim 13 wherein the second change in optical length is equal to the index of refraction times the change in physical length.

19. The resonator of claim 13 wherein the substrate has a planar surface upon which the waveguide means is attached.

20. The resonator of claim 19 wherein the waveguide means is zirconium dioxide.

* * * * *